United States Patent [19]

Feurer et al.

[11] 4,409,258
[45] Oct. 11, 1983

[54] TREATMENT PROCESS FOR RENDERING CORNEAL CONTACT LENSES HYDROPHILIC

[75] Inventors: Bernard Feurer, Saint Orens de Gameville; Philippe Baronet, Toulouse, both of France

[73] Assignee: Alcon Pharmaceuticals Limited, Cham, Switzerland

[21] Appl. No.: 260,674

[22] Filed: May 5, 1981

[30] Foreign Application Priority Data

May 29, 1980 [FR] France ................. 80 12169

[51] Int. Cl.³ ................. G02B 1/12; G02B 1/04
[52] U.S. Cl. ................. 427/38; 427/40; 427/41; 427/164
[58] Field of Search ................. 427/40, 164, 41, 38

[56] References Cited

U.S. PATENT DOCUMENTS

| | | | |
|---|---|---|---|
| 3,944,709 | 3/1976 | Levy | 427/40 X |
| 4,072,769 | 2/1978 | Lidel | 427/40 X |
| 4,143,949 | 3/1979 | Chen | 427/41 X |
| 4,214,014 | 7/1980 | Hofer et al. | 427/40 |

*Primary Examiner*—James R. Hoffman
*Attorney, Agent, or Firm*—Shlesinger, Arkwright, Garvey & Fado

[57] ABSTRACT

A process for rendering contact lenses made of a polymer or mixture of polymers hydrophilic or increasing their hydrophilic nature comprising generating a beam of positive ions which are essentially of equal kinetic energy, bombarding in an essentially uniform manner the surface of each lens by means of this beam and thereafter hydrating each contact lens; the positive ion beam is obtained by subjecting a gas from the group consisting of nitrogen, oxygen or compounds of these to an electric field produced between a cathode and an anode and in causing part of the accelerated positive ions to pass through the cathode.

9 Claims, 3 Drawing Figures

TREATMENT PROCESS FOR RENDERING CORNEAL CONTACT LENSES HYDROPHILIC

The invention concerns a treatment process for corneal contact lenses made from a synthetic polymer or a mixture of synthetic polymers in order to render said lenses hydrophilic or to increase their hydrophilic nature at the surface and across a specified depth. The invention applies in particular to treating lenses made of a hydrophobic or partially hydrophobic polymer, in particular polymethylmethacrylate (PMMA) or silicone.

It is known that good toleration of the corneal lenses is related to several parameters and in particular to the hydrophilic nature of the side of the lens which makes contact with the cornea. In order to meet this requirement, the lenses made of hydrophobic or slightly hydrophobic polymers as a rule are surface-treated by being immersed in a gaseous atmosphere subjected to an electric discharge. Due to the corona effect, this discharge generates a plasma consisting of positive and negative ions, electrons and neutral particles, and experiment has shown that the polymers placed at the core of this plasma undergo physical-chemical surface changes accompanied in particular by an increase in hydrophilic properties.

However it has also been observed with respect to this kind of process that the obtained effects are highly heterogeneous at the lens surface and remain only for a time much less than the ordinary life of a corneal lens.

A primary object of the present invention is therefore to provide an improved process for treating the lenses in a uniform manner for the purpose of endowing them with a homogeneous hydrophilic property across their entire surface.

Another object is to create a treatment both of the surface and of a given material depth to thereby achieve a long-term effect.

To that end, the process of the present invention comprises generating a beam of positive ions which are substantially of the same kinetic energy, this beam being obtained by subjecting a gas of the nitrogen, oxygen grpoup or of a compound of nitrogen or oxygen to an electric field produced between a cathode and an anode and in making part of the positive ions accelerated by the cathode traverse said cathode, bombarding in a substantially uniform manner the surface of each lens by means of said positive ion beam and thereupon carrying out a hydration of each contact lens.

In a preferred mode of implementation, a positive ion beam of a narrow and elongated cross-section is formed, which extends over a length at least equal to the diameter of a lens, and each lens is swept by this beam on account of its displacement with respect to it.

Good results are obtained by using a gas of the following group, $O_2$, $H_2O$, $N_2O$, $N_2$, $NO_2$, $NO$, $N_2O_3$, $CO_2$, $CO$ and $NH_3$ to form such a beam, where such a gas is supplied between the anode and the cathode at a pressure between $10^{-4}$ and $10^{-3}$ millibars.

Moreover, the anode preferably will be raised to a potential of several kilovolts with respect to the cathode, in particular from about $+2$ Kv to $+8$ kv, so as to generate a beam with an ion density of the order of several tens of microamperes per $cm^2$, in particular between about 10 and 100 microamperes/$cm^2$.

After the lens has been bombarded, it is hydrated by dwelling in an aqueous medium in order to hydrolyze the new functional groups formed by the bombardment. The treatment stability is substantially improved if the lens is held at a temperature between about 45° and 65° C., the dwell time being shortened with respect to that required at ambient temperature by the order of several hours.

The conception and the implementation of the invention did require two research stages: in the first place, the inventors analyzed the grounds for the inadequacies of the conventional methods resulting in treatment heterogeneities; then they delved into developing a treatment process which would be free from those causes.

In the conventional methods, the lens is immersed into the core of a plasma of diverse particles (positive ions, negative ions, electrons, neutral particles); these particles evince very different kinetic energies. These charged particles move toward the cathode or anode, and in the course of their motions are exposed to collisions with other particles whereby they are either discharged, or decelerated, or accelerated.

There is therefore an extreme variation in the kind of particles, their speeds, their energies and their directions, as they impinge on the lens surface. This explains the destruction of the hydrophobic sites and their replacement by hydrophilic sites taking place in a random, very heterogeneous manner.

In the process of the present invention on the other hand, the lens treatment takes place by means of a beam of positive ions of identical nature (depending on the gas being used) and substantially of the same kinetic energy. As a matter of fact, only these positive ions formed from the molecules of the gas being used can cross the cathode and the energy which is imparted to them—which relates to the potential difference between anode and cathode—is about the same for each of these ions. The negative ions and the electrons move toward the anode and are trapped, whereas the non-ionized particles that may escape lack the sufficient energy to effectively impinge on the lens surface.

The equal kinetic-energy feature and the uniform nature of the ions crossing the cathode are further enhanced by generating a very narrow beam formed through a fine slit fashioned in the cathode. In this manner one achieves uniform sweeping of the lens surface by means of this beam and excellent treatment homogeneity, as each point of the surface substantially receives the same amount of ions and the same incident energy.

Experimentation moreover has shown that the process of the invention permits implementing not only a lens surface treatment but also treatment across a given depth of the material. Thus, the hydrophilic character affects in lasting manner a layer of material the thickness of which may be of the order of several tens to several hundreds of angstroms. The operational conditions stated above permit achieving optimal results without danger of degradation to the polymers.

As the invention was described above in its general terms, the description below shall now provide several illustrative implementations of the process. These examples were developed using equipment of the kind shown in the drawing.

Figure 1:
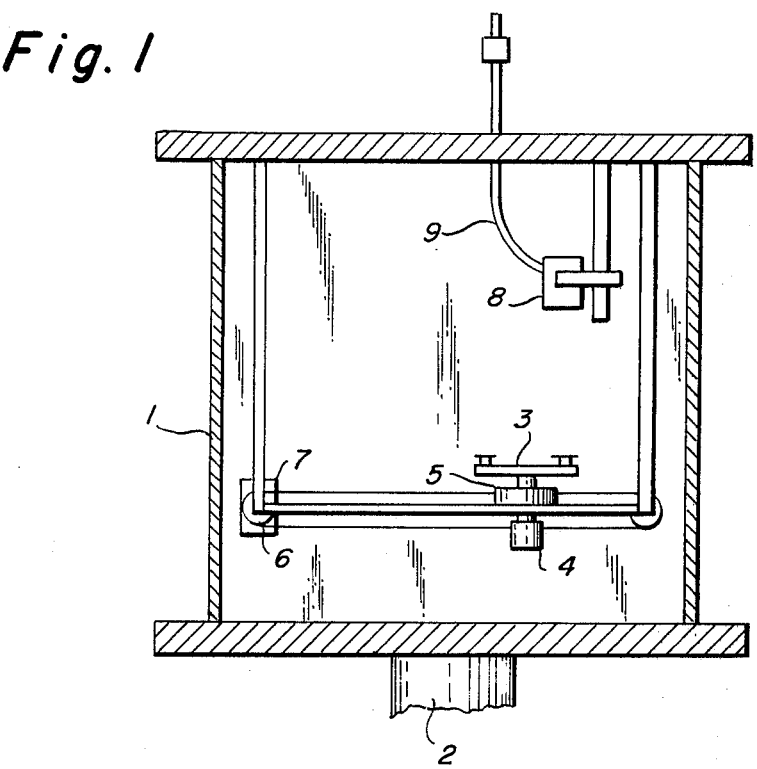
FIG. 1 is a schematic view of the equipment.

The equipment used to implement the examples described herebelow essentially comprises an enclosure 1 connected by a conduit 2 to a vacuum pump so as to obtain a secondary vacuum in this enclosure of the order of $2\times 10^{-6}$ millibars.

This enclosure 1 comprises in its lower part a pan 3 which can be actuated into reciprocation at an amplitude slightly in excess of the lens diameter on one hand, and on the other into stepped rotational motion.

To that end the pan 3 is mounted on a rotating shaft driven by a motor 4 and is supported by a carriage 5 which is joined to a cable guided and driven by pulleys 6 from a rotary step-motor 7. As these means are known per se, they will not be described in further detail.

The lenses are arrayed along the rim of the pan 3 on appropriate supports. An ion source 8 connected to a gas supply 9 at a given pressure P is located above one of the lenses.

Figure 2:
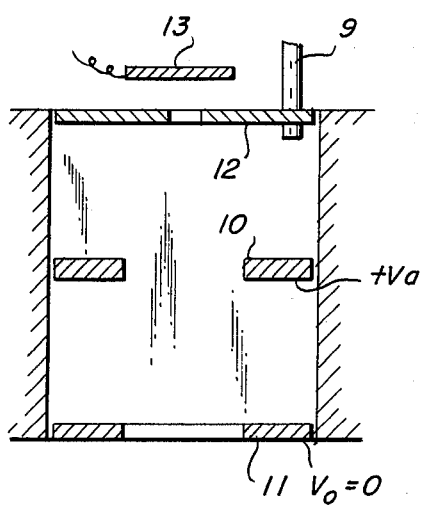
FIG. 2 is a schematic view of one of the components of said equipment.
Figure 3:
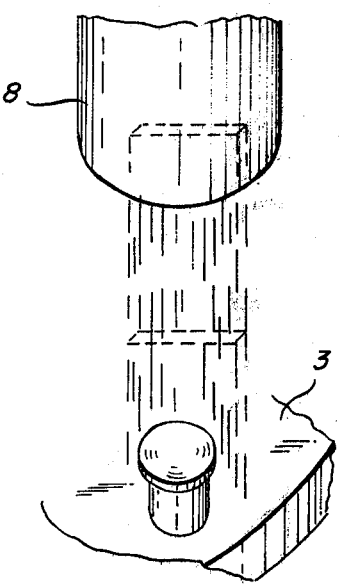
FIG. 3 is a schematic view illustrating the sweeping of a lens.

Such a source 8 is well known per se, and its principle is schematically indicated in FIG. 2. The source comprises an anode 10 bounding two chambers communicating with each other. Each chamber is closed by one cathode, cathode 11 being slotted by a fine slit of a length slightly exceeding the lens diameter, to allow the ionic treatment beam to pass, and the other cathode 12 being provided with a small aperture opposite a test strip 13 for measuring the ionic current. The slit in cathode 11 in particular may assume a rectangular shape, its length being about 15 mm and its width about 1 mm.

The anode 10 is raised to a supply voltage $V_A$ with respect to the cathodes, and the ion beam emitted from the source 8 passes through the cathode 11 and is directed at an essentially perpendicular incidence on one of the lenses on pan 3. Such incidence may deivate from normal up to an angle of about 30°.

The reciprocating motion of the pan 3 produces from one to ten to-and-fro sweeps per minute, the treatment time of each lens as defined by the interval between two rotational sequences of the pan varying from 1 to 25 minutes.

EXAMPLE 1

The lenses being treated are polymethylmethacrylate.

The gas supplied between the anode and the cathode is oxygen at a pressure $P=4\times 10^{-4}$ millibars.

The supply voltage $V_A$ to the anode is 2.4 kv and the current density of the positive ion beam through the cathode 11 is 17 microamps/cm$^2$.

Each lens is subjected to seven to-and-fro sweeps per minute and the exposure time is ten minutes.

Thereupon the lenses are hydrated by immersing them in ambient temperature water.

EXAMPLE 2

The following were the implementing conditions for this example:
polymethylmethacrylate lenses
gas=oxygen
pressure $P=3\times 10^{-4}$ millibars
$V_A=7$ kv
current density=81 microamps/cm$^2$
treatment time=15 minutes with seven to-and-fro sweeps per minute
hydration=12 hour dwell-time in ambient temperature water.

EXAMPLE 3

The implementation conditions for this example were as follows:
PMMA lenses
gas=oxygen
pressure $P=2\times 10^{-4}$ millibars
$V_A=5$ kv
current density=53 microamps/cm$^2$
treatment time=10 minutes with seven to-and-fro sweeps a minute
hydration:3 hours in 60° C. water.

EXAMPLE 4

The following implementation conditions applied:
PMMA lenses
gas=oxygen
pressure $P=2.8\times 10^{-4}$ millibars
$V_A=6.5$ kv
current density=53 microamps/cm$^2$
treatment time=10 minutes with seven to-and-fro sweeps per minute
hydration=3 hours in 60° C. water.

EXAMPLE 5

The following conditions were applied:
PMMA lenses
gas=H$_2$O
pressure $P=2.1\times 10^{-4}$ millibars
$V_A=6.5$ kv
current density=38 microamps/cm$^2$
treatment time=15 minutes at seven sweeps to-and-fro per minute
hydration=3 hours in 60° C. water.

EXAMPLE 6

The following conditions were applied:
silicon lenses
gas=oxygen
pressure $P=2.2\times 10^{-4}$ millibars
$V_A=5.5$ kv
current density=60 microamps/cm$^2$
treatment time=15 minutes at seven to-and-fro sweeps a minute
hydration=2 days in ambient temperature water.

For all of the above cited examples, control tests were run on patients provided with lenses treated in conformity with the invention and lenses not treated.

It was observed that the non-treated lenses in many cases caused poor tolerance by the user and in as little as one hour of use. The patient is uncomfortable and hampered; his vision and visual acuity are mediocre. In some cases edema is formed, and/or fatty secretions.

The treated lenses on the contrary are tolerated well in all cases after 12 hours of wearing. The following phenomena were observed: edema disappearance, extension of duration of wear, improvement in visual acuity and in comfort.

These results are related to the good hydrophilic properties of the lens surface, to the homogeneity of this hydrophilic feature across the entire surface and to substantial depth to which the treatment is effective.

The fatty hydrophobic bodies from the eye are effectively repelled by the hydrophilic layer, and this explains the absence of depositions. Moreover, the circulation of the lacrymal liquid is carried out in satisfactory manner between the eye and the lens due to the hydrophilic layer; the eye remains permanently impregnated and received also permanently the oxygen dissolved in the lacrymal liquid, whereby the good toleration of the lenses and their comfort is explained.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

We claim:

1. A process for treating contact lenses made of polymers or mixtures of polymers, said process rendering said lenses hydrophilic or increasing their hydropilic nature at their surface and to a given depth, said process comprising: producing an electric field between a cathode and an anode; subjecting a gas from the group consisting of nitrogen, oxygen, and compounds thereof to the electric field, the gas being supplied between the anode and the cathode at a pressure between $10^{-4}$ and $10^{-3}$ millibars; causing at least a part of the positive ions accelerated by the cathode to traverse the cathode in a narrow beam thereby generating a narrow beam of positive ions identical in nature and having substantially the same kinetic energy; bombarding each lens at a position removed from between the cathode and the anode with the positive ion beam by having the positive ion beam sweep over the lens so as to expose the surface of the lens uniformly to the beam whereby each point of the surface receives substantially the same amount of ions at the same incident energy thereby achieving homogeneous treatment of the lens surface and to a given depth within the lens; and, thereafter hydrating each contact lens.

2. A treatment process as in claim 1, comprising generating said positive ion beam with a narrow and elongated cross-section and extending over a length at least equal to the diameter of a lens, and causing each lens to be swept by the beam by a relative displacement of said beam and said lens.

3. A treatment process as in claim 1, comprising generating said positive ion beam using a gas selected from the group consisting of $O_2$, $H_2O$, $N_2$, $N_2O$, $NO$, $NO_2$, $N_2O_3$, $CO_2$, $CO$ and $NH_3$.

4. A treatment process as in claim 1, characterized in that the anode is raised to a potential between about +2 kv and +8 kv with respect to the cathode so as to generate a beam with an ion density between about 10 and 100 microamps/cm$^2$.

5. A treatment process as in claim 4, characterized in that between one and 10 to-and-fro sweeps are generated per beam, the treatment time of one lens being of the order of 1 to 25 minutes.

6. A treatment process as in claim 1, 2, 3, 4, or 5, characterized in that the positive ion beam is directed on each lens at normal incidence or deviating from normal by less than 30°.

7. A treatment process as in claim 2, characterized in that the lenses are arrayed at the rim of a pan subjected to a reciprocating motion so adjusted as to sweep one lens by the positive ion beam and a rotary step motion adjusted to sequentially bring the lenses to the site of the beam.

8. A treatment process as in claim 1, 5 or 7, characterized in that the lenses are hydrated by means of dwell times of several hours in water at a temperature between about 45° C. and 65° C.

9. A treatment process as in claim 8, wherein said lenses are made of PMMA or silicone.

* * * * *